Patented Mar. 29, 1938

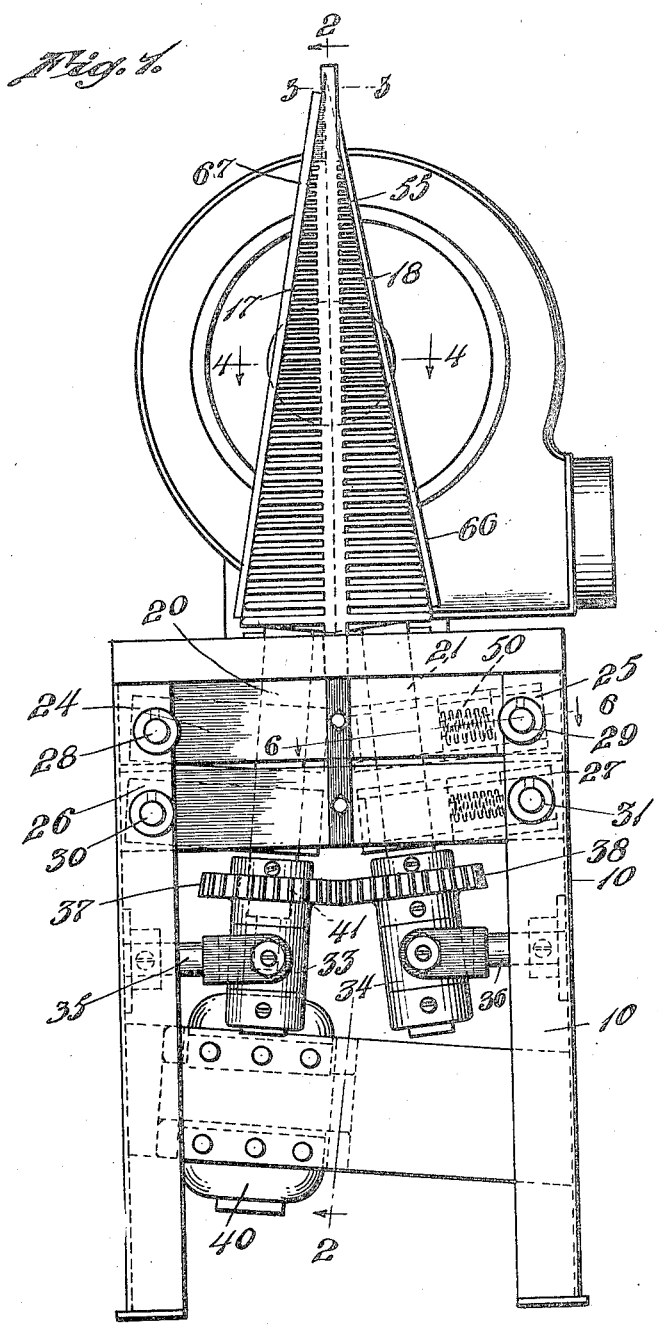

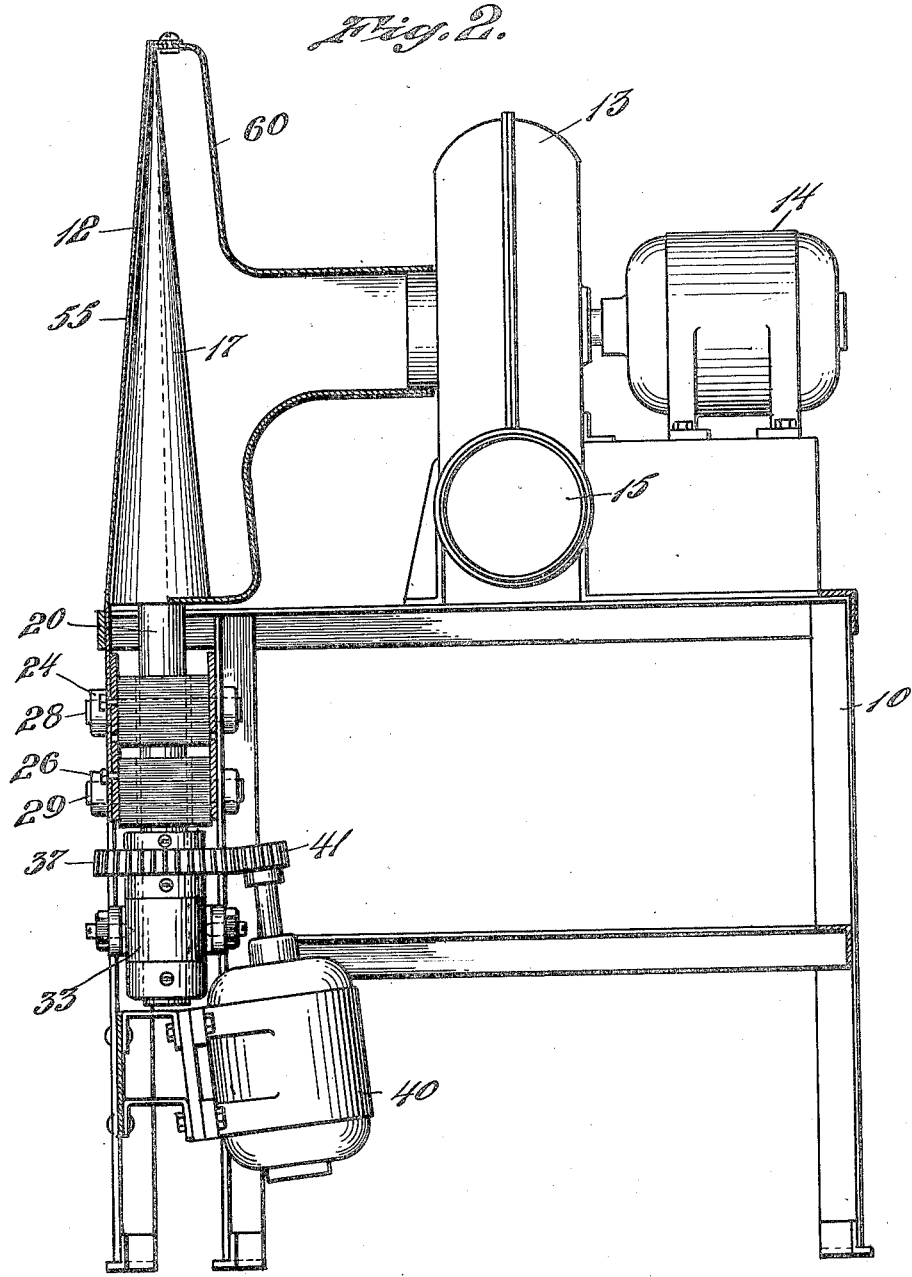

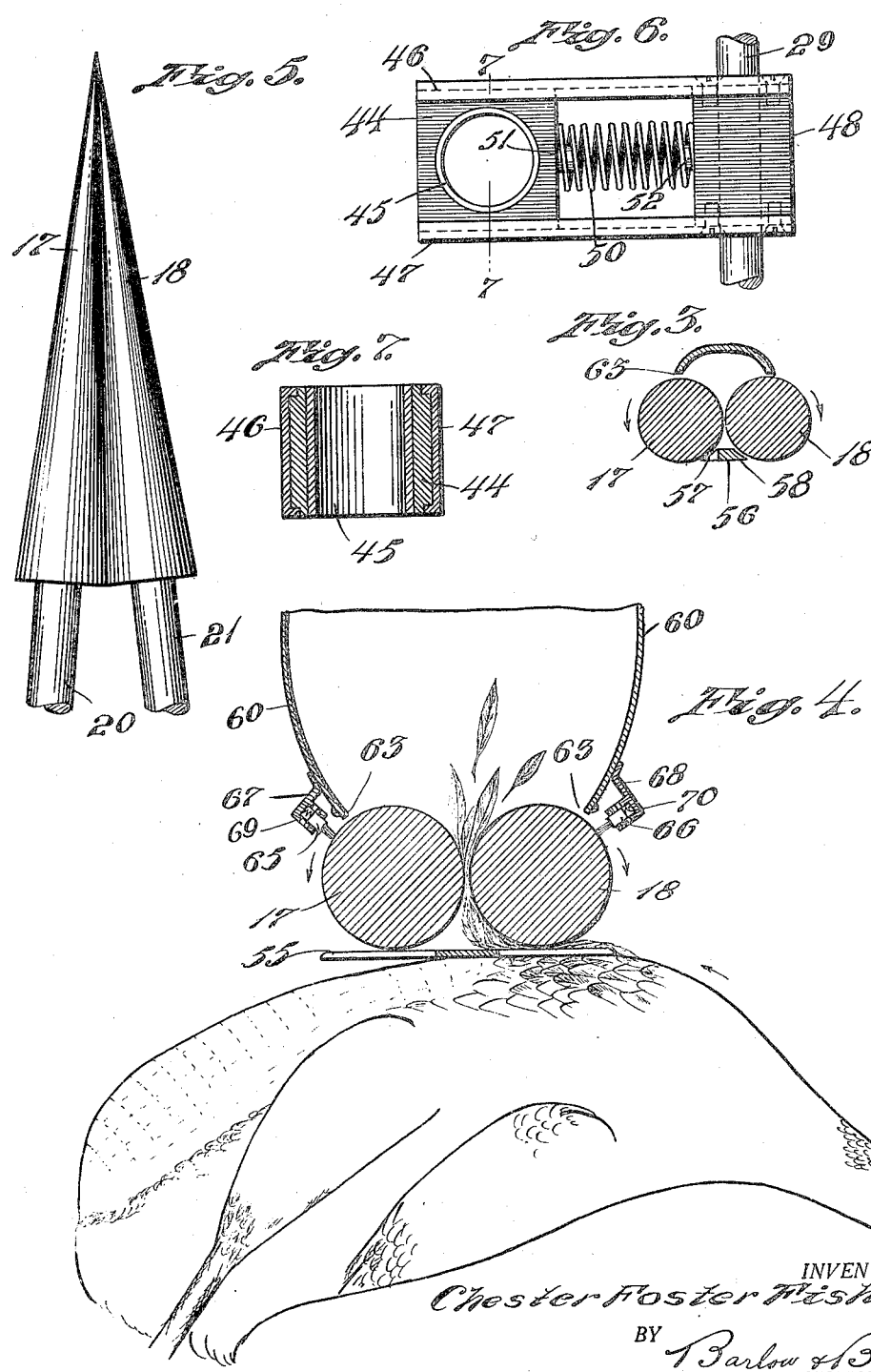

2,112,230

UNITED STATES PATENT OFFICE 2,112,230

FEATHER PLUCKING MACHINE

Chester Foster Fisher, Providence, R. I., assignor to James M. Stockett, Providence, R. I.

Application October 21, 1935, Serial No. 45,878

11 Claims. (Cl. 17—11.1)

This invention relates to a machine for removing the feathers of birds and various fowls, and more particularly for plucking feathers from chickens and other poultry; and has for one of its objects to provide a simple and compact apparatus for this purpose which will be efficient and long lived in its service.

Another object of the invention is to provide a machine which will not only satisfactorily pluck the large and strong feathers from the body of the bird but will also pull out the fine pin feathers clean from the fowl without injury thereto by tearing or breaking of the skin.

Another object of the invention is to provide a feather plucking machine construction in which the plucking rollers are supported solely at one end thereof whereby the entire length of the rollers including the free end portions may be available for use in gripping the feathers.

Another object of the invention is to provide a machine construction which makes use of tapered or cone-shaped rollers for plucking the feathers from poultry in which the rollers are so mounted thereon that plucking may be obtained at any portion along the entire length of the tapered rollers, from the base of the cone to its apex.

Another object of the invention is the provision of an improved guide or comb for guiding the feathers to the plucking rollers in which the shape of the comb and the arrangement and form of its teeth are such that the respective portions of the comb which receive and guide the various sizes of feathers, from the largest to the finest, accordingly lie opposite the portions of the rollers which operate on said parts of the fowl and the comb extend along the entire length of the rollers.

A still further object of the invention is to provide a feather plucking machine of the character set forth in which a suction device is arranged to cause an even air suction or draft along the entire extent of the gripping portions of the rollers to rapidly draw the feathers therebetween and remove them from the plucker and discharge them into a suitable receptacle.

With these and other objects in view, the invention consists in certain novel features of construction, as will be more fully described, and particularly pointed out in the appended claims.

In the accompanying drawings:

Fig. 1 is a front elevation of the improved feather plucking machine;

Fig. 2 is a sectional side view taken on the line 2—2 of Figure 1;

Fig. 3 is a section, on an enlarged scale, taken approximately on the line 3—3 of Figure 1;

Fig. 4 is a section, on an enlarged scale, taken approximately on the line 4—4 of Figure 1 illustrating the bird in perspective and showing it in position for the plucking operation;

Fig. 5 is a fragmentary detail view, in side elevation, of the plucking rollers;

Fig. 6 is a fragmentary top plan view, on an enlarged scale, of the bearing assembly for the plucking rollers; and Fig. 7 is a section on the line 7—7 of Figure 6.

It is found in plucking feathers from birds and poultry that great care must be exercised to prevent tearing of the flesh. Since it has been largely customary to pick the feathers from fowls by a manual operation, it is found that such a procedure is very slow and costly, both in time and money, and in order to eliminate the laborious hand operations, I have provided a simple and compact machine construction; and to accomplish this in a simple and effective way I have provided a pair of vertically arranged, oppositely rotatable, cone-shaped rollers which are rigidly mounted and supported at only one end thereof upon the frame of the machine whereby the points of the cones are free to present their end portions for plucking the finer feathers of birds; and I have also provided a comb in close proximity to the rollers for separating and guiding the feathers to the gripping portions of the rollers in which the width of the teeth and the adjacent spaces therebetween is progressively graduated along the entire length of the comb with the larger and heavier teeth opposite the base portions of the cones and extending therealong in graduated sizes the whole length thereof in the direction of the apex of the cones, opposite which face the smaller and finer teeth; and I also provide an air suction device in which an even suction or draft is set up through the entire gripping zone of the rollers; and the following is a detailed description of the present embodiment of my invention and showing one means by which these advantageous results may be accomplished.

With reference to the drawings, 10 designates the frame of the machine, shown in the drawings as being generally constructed of standard angle-iron pieces, and on the upper portion of this frame there is mounted the plucker 12 and a suction fan 13 in communication with this plucker. This fan 13 may be driven from any suitable source of power, but in the illustrated embodiment I have shown it connected with a motor 14. The fan is provided with a suitable discharge opening 15 whereby the plucked feathers which are drawn through the plucker may be removed and suitably discharged into a receptacle (not shown).

The plucker 12 comprises a pair of rotatable, tapered or cone-shaped rollers 17 and 18, respectively, which are rigidly mounted upon the frame by the shafts 20 and 21 with the adjacent surfaces of these rollers disposed in a substantially vertical plane. The rollers are normally in contact with each other and while they have been illustrated as being smooth they may, if desired, be provided with roughened or ribbed gripping surfaces, the former of which may be produced by a sand blasting operation. Each roller and its shaft may be turned out of a single piece of metal or may comprise separate bodies. However, the former method is preferred since any tendency towards a poor fitting of the shaft in the rollers is eliminated. These shafts 20 and 21 extend downwardly from the base of the rollers 17 and 18 and are journaled for rotation in the bearing units 24, 25, 26, and 27, respectively, to provide suitable bearings therefor and which are in turn pivotally mounted on the studs 28, 29, 30, and 31 secured in the frame 10 so as to permit relative yielding movement of the rollers 17 and 18 toward and away from each other when the feathers are drawn between the two rollers to produce a space therebetween, as will be hereinafter described. The lower ends of the shafts 20 and 21 are journaled in the trunnions 33 and 34, respectively, which are arranged in the arms 35 and 36 fixedly secured to the frame 10. Mounted on and secured to the shafts 20 and 21 between the respective bearing units 26 and 27 and the journals 33 and 34 are the bevel gears 37 and 38, respectively, which mesh with each other and serve to rotate the plucking rolls in opposite directions. A motor 40 is mounted in a suitable manner on the frame 10 and is provided with a suitable gear 41 which meshes with the gear 37 on the roller 17 to transmit power to rotate the plucking rollers. If desired, both the rollers may be driven directly by a power device.

In order to permit a relative yielding movement of the plucking rolls, one or both rolls may be movable, however, I prefer to fixedly mount the shaft 20 and I pivotally arrange the bearing units 25 and 27 for the shaft 21 to be movable, and the units each comprises a cored block 44 having a bearing sleeve 45 wherein the shafts are journaled, the block 44 being slidably mounted and secured between a pair of channel members 46 and 47, forming the side arm portions of the pivoted bearing units and serving as guideways for the block during its sliding movement. The inner end portions of the channel members 46 and 47 are suitably secured to the adjoining sides of a spacer block 48 which is mounted on one of the pivot studs, such as stud 29 as shown in Fig. 6. A spring 50 is disposed between the blocks 44 and 48, respectively, and is supported in position on the bosses 51 and 52 thereof, the pressure of the spring acting to maintain the rollers 17 and 18 in contact with each other yet permitting them to yield relatively to one another and be moved away from each other during the passage of feathers of various sizes and thicknesses between the rollers. The shaft 20 is fixedly journaled in suitable bearings in the units 24 and 26, respectively, and being fixedly mounted the spring actuated blocks 44 are dispensed with.

Disposed adjacently to the entrance side of the rollers is a comb 55, preferably of metal, and approximately triangular in shape, having teeth extending laterally of the rollers and positioned very closely to their surfaces. These teeth are preferably so shaped at their ends so as not to tear or dig into the flesh of the fowl. As illustrated in Figure 1 of the drawings, the width of the teeth and the space therebetween is shown as progressively decreasing or graduated in length and thickness from the base portion of the comb along its entire length to the apex. The teeth at the base end of the comb are thicker and heavier with wider spacing than those at the top and which are of smaller and finer size. The teeth at the apex end of the comb are formed in the central rib 56 of the comb and only in one side thereof, so that these fine teeth are cut either on the right or left side of the rib, depending on whether the machine is to be right or left handed. The rib 56 extends beyond the bottom end portion of the comb and is suitably secured to the frame 10 while the upper end of the rib carrying the fine teeth is beveled as at 57 and 58 so as to lie closely adjacent to the rollers 17 and 18. Mounted at the rear of the plucking rollers is a casing 60 which communicates with the suction fan 13, the front portion of this casing being provided with a triangularly shaped opening 61, shown in dotted outline in Figure 1, through which the plucked feathers are drawn by the fan suction from the rollers. The top end of the rib 56 of the comb may be bent to extend over the top end of the rollers and secured to the casing 60. However, if desired, a separate frame may be used to hold the comb. As illustrated in Figures 3 and 4, the edges of the side walls of the casing are arranged to lie closely to the gripping surfaces of the rollers 17 and 18, however, a slight gap 63 is left between the roller and the casing wall to provide a proper air space to secure the desired amount of suction by the fan.

A pair of brushes 65 and 66 composed of bristles and the like are mounted in suitable holders 67 and 68 secured to the sides of the casing 60, the brushes 65 and 66 being pressed into frictional contact against the surfaces of the rollers 17 and 18 by means of suitable springs 69 and 70 which apply an even pressure at the rear portions thereof in order to hold the brushes in contact with the rollers to sweep off any feathers or foreign material, such as husk, blood, fine feathers, etc., which may be sticking to the rollers. The springs 69 and 70 are so mounted in the holders 67 and 68 that they may be replaced when so desired. The brushes 65 and 66 may be formed of bristles, felt or other suitable material and this material preferably should form a solid wall extending the entire length of the casing opening.

The operation of this device will be apparent from the above disclosure. The motors 14 and 40 are started thus setting in motion the rollers 17 and 18 and the fan 13. The fowl which is to be plucked is then brought into contact with the comb 55 which receives thereinto the feathers of the bird and acts to separate and guide them where they may be gripped by the rotating rollers which quickly draw the feathers through the gripping portions and pull them from the flesh of the bird. The comb 55 serves also to prevent pulling apart or tearing of the flesh of the bird as it is being plucked. In carrying out this operation the body of the bird which has the larger feathers is operated on first by the larger portions of the plucking rollers opposite which the teeth of the comb and the spaces between them are the largest and heaviest and the finer feathers, such as the pin feathers, are subsequently removed by pressing the bird near the top portion of the comb where the teeth and spaces are finer, whereby the smaller and pointed ends of the rollers may be brought into operation to draw out the finer feathers. In carrying out this plucking operation the suction fan 13 in conjunction with the brushes 65 and 66 serves to rapidly draw the feathers between the plucking rollers to remove them therefrom and discharge them into a suitable container.

In accordance with this invention, I have provided a machine which quickly and neatly removes the finer feathers of fowl and furthermore, one which is of low cost to operate. The machine is very compact and the feathers may be plucked at any point along the entire length of the rollers, the ends of which are accessible at all times to carry on the plucking operation for the finest feathers. In the use of my machine, one works on the bird near the top of the rollers with the pointed ends thereof in order to remove the finer feathers of the fowl, which are closer to the top of the bird, hence, one is able to see the work better, which by reason of the vertical positioning of the plucking rollers, is brought nearer to the operator's eyes than would be the case with any other mounting arrangement of the rollers.

The foregoing description is directed solely towards the construction illustrated, but I desire it to be understood that I reserve the privilege of resorting to all the mechanical changes to which the device is susceptible, the invention being defined and limited only by the terms of the appended claims.

I claim:

1. In a feather plucking machine, a pair of co-acting rotatable conical rollers for gripping the feathers therebetween with the pointed ends thereof freely exposed, a pivoted member, and bearing means for rotatably supporting each roller located solely at the base end portion thereof, said bearing means for one of said rollers being slidably mounted on said pivoted member for movement transversely of the roller axis.

2. In a feather plucking machine, a pair of co-acting rotatable conical rollers for gripping the feathers therebetween, and yieldable means for rotatably supporting one of said rollers located solely at the base end thereof, said yieldable means being mounted on a movable support for sliding movement transversely of said roller axis.

3. In a feather plucking machine, a pair of vertically arranged rotatable cone-shaped rollers having co-acting portions along their entire length, and yieldable bearing means for rotatably supporting one of said rollers located solely at the lower end thereof, said yieldable means being mounted on a movable support for sliding movement transversely of said roller axis.

4. In a feather plucking machine, a pair of vertically-arranged, co-acting rotatable cone-shaped rollers for gripping the feathers therebetween, a spindle extending from the base end of each roller, upper and lower bearings for supporting said spindle, means to drive one of said rollers, and means carried by said spindles connecting one roller with the other whereby one of said rollers serves to oppositely rotate the other, said spindles and bearings serving as the only supporting means for said rollers, said upper bearing for one of said rollers being arranged for sliding movement transversely of the roller axis.

5. In a feather plucking machine, a pair of rotatable cone-shaped rollers for gripping the feathers therebetween, and a comb adjacent the rollers for guiding the feathers thereto, said comb having laterally extending teeth, the width and spacing thereof being progressively reduced in the direction from the base of the cones towards their apexes, and the comb being arranged in front of the cones and co-extensive therewith along the entire length thereof.

6. A machine for plucking feathers of birds comprising a support, a pair of co-acting oppositely rotatable cone-shaped rollers on said support for gripping the feathers therebetween, a comb in close proximity to said cones and extending along the entire length thereof, a member pivoted on said support, and yielding means for rotatably mounting one of said cones on said support whereby they may always be maintained in contact with each other yet will be permitted to move apart in response to the variations in sizes of the feathers that are fed between the cones, said yielding means including a bearing member slidably mounted on said pivoted member for movement transversely of the axis of the supported cone.

7. A machine for plucking feathers of birds comprising a frame, a pair of co-acting oppositely rotatable cone shaped rollers for gripping the feathers therebetween, one roller serving as a driving means for the other, a plurality of arms carrying each of said rollers and located at one end thereof, said arms for one of the rollers being pivotally mounted on the frame for relative movement of the rollers towards and from each other, bearing means for said roller on said pivoted arm and slidably mounted on the latter for sliding movement transversely of the axis of said roller, and means in driving engagement with one of said rollers for rotating the rollers.

8. A machine for plucking feathers of birds comprising a frame, a pair of co-acting relatively movable oppositely rotatable cone-shaped rollers having continuous conical plucking surfaces along their entire length for gripping the feathers therebetween, a plurality of arms carrying laterally movable bearings for supporting one of said rollers and located adjacent to one end thereof, said bearings being slidably mounted on said arms for movement transversely of the roller axis, said arms being pivotally mounted on the frame for relative movement of the rollers towards and from each other, means to support one of said rollers for pivoting movement, a gear on one of the rollers meshing with a gear on the other roller, and a positively driven gear meshing with the gear of one of the rollers for rotating the rollers.

9. In a feather plucking machine, a support, a pair of opposed, relatively movable, rotatable conical plucking members having inclined axes which lie in the same plane and whose vertex ends are unsupported and substantially meet to form a common apex, said members being provided with continuous conical plucking surfaces in rolling contact along their entire length for gripping the feathers, shafts extending from the base of said plucking members, bearings for supporting said shafts adjacent to the base ends of said plucking members, said bearing means for one of the plucking members being transversely slidable relative to the axis of the latter during relative spreading movement of said plucking members, drive means to rotate said plucking members, and pivotal means for supporting the lower end of one of said shafts and about which said plucking member pivots for relative movement towards and from the other, said drive means being interposed between said bearings and the pivotal support means of said shaft of the movable plucking member.

10. In a feather plucking machine, a support, a pair of opposed, relatively movable, rotatable conical plucking members having inclined axes which lie in the same plane and whose vertex ends are unsupported and substantially meet to form a common apex, said members being provided with continuous conical plucking surfaces in rolling contact along their entire length for gripping the feathers, shafts extending from the base of said plucking members, bearings for supporting said shafts adjacent to the base ends of said plucking members, said bearing means for one of the plucking members being transversely slidable relative to the axis of the latter during relative spreading movement of said plucking members, means acting on said slidable bearing means to urge said plucking members together, means to rotate said plucking members, and pivotal means for supporting the lower end of one of said shafts and about which said plucking member pivots for relative movement towards and from the other.

11. In a feather plucking machine, a support, a pair of opposed, relatively movable, rotatable conical plucking members having inclined axes which lie in the same plane and whose vertex ends are unsupported and substantially meet to form a common apex, said members being provided with continuous conical plucking surfaces in rolling contact along their entire length for gripping the feathers, shafts extending from the base of said plucking members, bearings for supporting said shafts adjacent to the base ends of said plucking members, said bearing means for one of the plucking members being transversely slidable relative to the axis of the latter during relative spreading movement of said plucking member, spring acting on said slidable bearing means to urge said plucking members together, means to rotate said plucking members in opposite directions, and pivotal means for supporting the lower end of one of said shafts and about which said plucking member pivots for relative movement towards and from the other.

CHESTER FOSTER FISHER.